US012761075B2

(12) United States Patent
Sanga et al.

(10) Patent No.: US 12,761,075 B2
(45) Date of Patent: Oct. 13, 2026

(54) METHOD FOR ESTIMATING TEMPERATURE OF LIGHT EMITTING MODULE, LIGHT EMITTING MODULE, AND AUTOMOTIVE UNIT

(71) Applicant: NICHIA CORPORATION, Anan (JP)

(72) Inventors: Daisuke Sanga, Tokushima (JP); Yoshiki Yamaji, Anan (JP); Yoshiyuki Kageyama, Tokushima (JP); Hiroaki Kuroda, Anan (JP)

(73) Assignee: Nichia Corporation, Anan (JP)

( * ) Notice: Subject to any disclaimer, the term of this patent is extended or adjusted under 35 U.S.C. 154(b) by 787 days.

(21) Appl. No.: 17/956,300

(22) Filed: Sep. 29, 2022

(65) Prior Publication Data

US 2023/0115310 A1 Apr. 13, 2023

(30) Foreign Application Priority Data

Oct. 8, 2021 (JP) ................................ 2021-166075
Jun. 13, 2022 (JP) ................................ 2022-095066

(51) Int. Cl.

| | |
|---|---|
| ***G01J 1/42*** | (2006.01) |
| ***B60Q 1/04*** | (2006.01) |
| ***B60Q 11/00*** | (2006.01) |
| ***G01K 1/02*** | (2021.01) |

(52) U.S. Cl.
CPC .................. *G01J 1/42* (2013.01); *B60Q 1/04* (2013.01); *B60Q 11/005* (2013.01); *G01K 1/026* (2013.01)

(58) Field of Classification Search
None
See application file for complete search history.

(56) References Cited

U.S. PATENT DOCUMENTS

| | | | | |
|---|---|---|---|---|
| 2008/0311707 | A1 | 12/2008 | Yoneda et al. | |
| 2012/0274544 | A1 | 11/2012 | Nakajima | |
| 2017/0006676 | A1* | 1/2017 | Sedzin | H05B 45/18 |
| 2018/0184495 | A1* | 6/2018 | Pelz | B60Q 11/00 |
| 2021/0035528 | A1 | 2/2021 | Tada | |
| 2021/0167572 | A1 | 6/2021 | Tabata et al. | |
| 2022/0208065 | A1 | 6/2022 | Kubo | |

FOREIGN PATENT DOCUMENTS

| | | | |
|---|---|---|---|
| JP | 2006-186288 | A | 7/2006 |
| JP | 2012-237972 | A | 12/2012 |
| JP | 2020-031120 | A | 2/2020 |
| JP | 2021-021854 | A | 2/2021 |
| JP | 2021-110772 | A | 8/2021 |
| WO | 2020/225906 | A1 | 11/2020 |
| WO | 2021/044572 | A1 | 3/2021 |

* cited by examiner

*Primary Examiner* — Michael P LaPage
*Assistant Examiner* — Chad Andrew Reverman
(74) *Attorney, Agent, or Firm* — Kim & Stewart LLP

(57) ABSTRACT

A method for estimating a temperature of a light emitting module having a plurality of light emitting elements is provided. The method includes, based on a lighting pattern of the light emitting module, which represents an intensity of light emitted from each of the light emitting elements, estimating respective temperatures of at least a part of the light emitting elements that are operated in accordance with the lighting pattern.

4 Claims, 13 Drawing Sheets

Lighting Percentage (%)

| | | | | | | |
|---|---|---|---|---|---|---|
| 0 | 0 | 0 | 0 | 0 | 0 | 0 |
| 0 | 50 | 50 | 50 | 50 | 50 | 0 |
| 0 | 50 | 80 | 80 | 80 | 50 | 0 |
| 0 | 50 | 80 | 100 | 80 | 50 | 0 |
| 0 | 50 | 80 | 80 | 80 | 50 | 0 |
| 0 | 50 | 50 | 50 | 50 | 50 | 0 |
| 0 | 0 | 0 | 0 | 0 | 0 | 0 |

Lighting Percentage (%)

| | | | | | | |
|---|---|---|---|---|---|---|
| 0 | 0 | 0 | 0 | 0 | 0 | 0 |
| 20 | 40 | 60 | 80 | 60 | 40 | 20 |
| 30 | 50 | 80 | 100 | 80 | 50 | 30 |
| 30 | 50 | 80 | 100 | 80 | 50 | 30 |
| 20 | 40 | 60 | 80 | 60 | 40 | 20 |
| 0 | 0 | 0 | 0 | 0 | 0 | 0 |
| 0 | 0 | 0 | 0 | 0 | 0 | 0 |

FIG. 10

Variables Σh

| | | | | | | |
|---|---|---|---|---|---|---|
| 61 | 69 | 74 | 74 | 70 | 63 | 55 |
| 72 | 83 | 91 | 91 | 85 | 75 | 63 |
| 81 | 98 | 110 | 109 | 101 | 86 | 70 |
| 84 | 106 | 132 | 120 | 114 | 91 | 73 |
| 81 | 98 | 110 | 109 | 101 | 86 | 70 |
| 72 | 83 | 91 | 91 | 85 | 75 | 63 |
| 61 | 69 | 74 | 74 | 70 | 63 | 55 |

FIG. 11

Kernel

| | | | | |
|---|---|---|---|---|
| 0.53 | 0.61 | 0.64 | 0.61 | 0.53 |
| 0.61 | 0.73 | 0.80 | 0.73 | 0.61 |
| 0.64 | 0.80 | 1.00 | 0.80 | 0.64 |
| 0.61 | 0.73 | 0.80 | 0.73 | 0.61 |
| 0.53 | 0.61 | 0.64 | 0.61 | 0.53 |

FIG. 12

Measured Temperature Values (C°)

| | | | | | | |
|---|---|---|---|---|---|---|
| 121 | | | 125 | | | |
| | | 137 | | | 121 | |
| | 142 | | 142 | | | |
| | | | | 137 | | 119 |
| 134 | | | 142 | | 125 | |
| | | 137 | | | | 110 |
| | 125 | | 125 | | 115 | |

Light Emitting Element Temperatures:
Measured Values and Estimated Values (C°)

| | | | | | | |
|---|---|---|---|---|---|---|
| 121 | 120 | 123 | 125 | 121 | 116 | 112 |
| 122 | 128 | 137 | 133 | 130 | 121 | 116 |
| 127 | 142 | 145 | 142 | 139 | 130 | 121 |
| 129 | 142 | 158 | 151 | 137 | 133 | 119 |
| 134 | 138 | 145 | 142 | 139 | 125 | 121 |
| 122 | 128 | 137 | 133 | 130 | 124 | 110 |
| 115 | 125 | 123 | 125 | 121 | 115 | 112 |

Light Emitting Element Temperatures:
Estimated Values (C°)

| | | | | | | |
|---|---|---|---|---|---|---|
| 115 | 120 | 123 | 123 | 121 | 116 | 112 |
| 122 | 128 | 133 | 133 | 130 | 124 | 116 |
| 127 | 138 | 145 | 144 | 139 | 130 | 121 |
| 129 | 142 | 158 | 151 | 147 | 133 | 122 |
| 127 | 138 | 145 | 144 | 139 | 130 | 121 |
| 122 | 128 | 133 | 133 | 130 | 124 | 116 |
| 115 | 120 | 123 | 123 | 121 | 116 | 112 |

| Lighting Pattern(Representative) | Estimated Error ( °C ) | |
|---|---|---|
| | Fourth Embodiment | First Embodiment |
| Wide Light Distribution Pattern  | 1.3 | -1.7 |
| Narrow Light Distribution Pattern  | -0.5 | -6.8 |
| Edge Light Distribution Pattern  | -0.1 | -6.4 |

METHOD FOR ESTIMATING TEMPERATURE OF LIGHT EMITTING MODULE, LIGHT EMITTING MODULE, AND AUTOMOTIVE UNIT

CROSS-REFERENCE TO RELATED APPLICATIONS

This application also claims priority to Japanese Patent Application No. 2021-166075, filed on Oct. 8, 2021 and Japanese Patent Application No. 2022-095066, filed on Jun. 13, 2022, the contents of which are incorporated by reference herein in their entireties.

FIELD

Certain embodiments of the present disclosure relate to a method for estimating a temperature of a light emitting module, a light emitting module, and an automotive unit.

BACKGROUND

In a light emitting module, a large number of light emitting elements mounted on a single wiring board are individually controlled. In such a light emitting module, it is difficult to commonly control temperatures of all light emitting elements because the magnitude of temperature increase varies among the light emitting elements depending on a lighting pattern. In the case of involving a large number of light emitting elements, furthermore, it is difficult to measure the temperatures of all light emitting elements.

SUMMARY

Certain embodiments of the present disclosure made in view of the problems described above aim to provide a method for estimating a temperature of a light emitting module, a light emitting module, and an automotive unit, which involve estimation of temperatures of a plurality of light emitting elements.

A method for estimating a temperature of a light emitting module having a plurality of light emitting elements is provided. The method includes, based on a lighting pattern of the light emitting module, which represents an intensity of light emitted from each of the light emitting elements, estimating respective temperatures of at least a part of the light emitting elements that are operated in accordance with the lighting pattern.

A light emitting module includes a wiring board, a plurality of light emitting elements on the writing board, and a controller provided in the wiring board. The controller is configured to estimate, based on a lighting pattern, which represents an intensity of light emitted from each of the light emitting elements, respective temperatures of at least a part of the light emitting elements that are operated in accordance with the lighting pattern.

An automotive unit includes a light emitting module mountable on a vehicle and a controller mountable on the vehicle. The light emitting module includes a wiring board and a plurality of light emitting elements on the wiring board. The controller is configured to estimate, based on a lighting pattern, which represents an intensity of light emitted from each of the light emitting elements, respective temperatures of at least a part of the light emitting elements that are operated in accordance with the lighting pattern.

According to certain embodiments of the present disclosure, a method for estimating a temperature of a light emitting module, a light emitting module, and an automotive unit with suitable controllability of light emitting elements can be provided.

BRIEF DESCRIPTION OF THE DRAWINGS

FIG. 10 is a chart showing variables corresponding to light emitting elements.

FIG. 11 is a chart showing an example of a kernel used in obtaining convolution integrals of functions.

FIG. 12 is a chart showing an example of measured temperature values of a certain group of light emitting elements.

DETAILED DESCRIPTION

First Embodiment

A light emitting module according to a first embodiment will be explained first.

Figure 1:
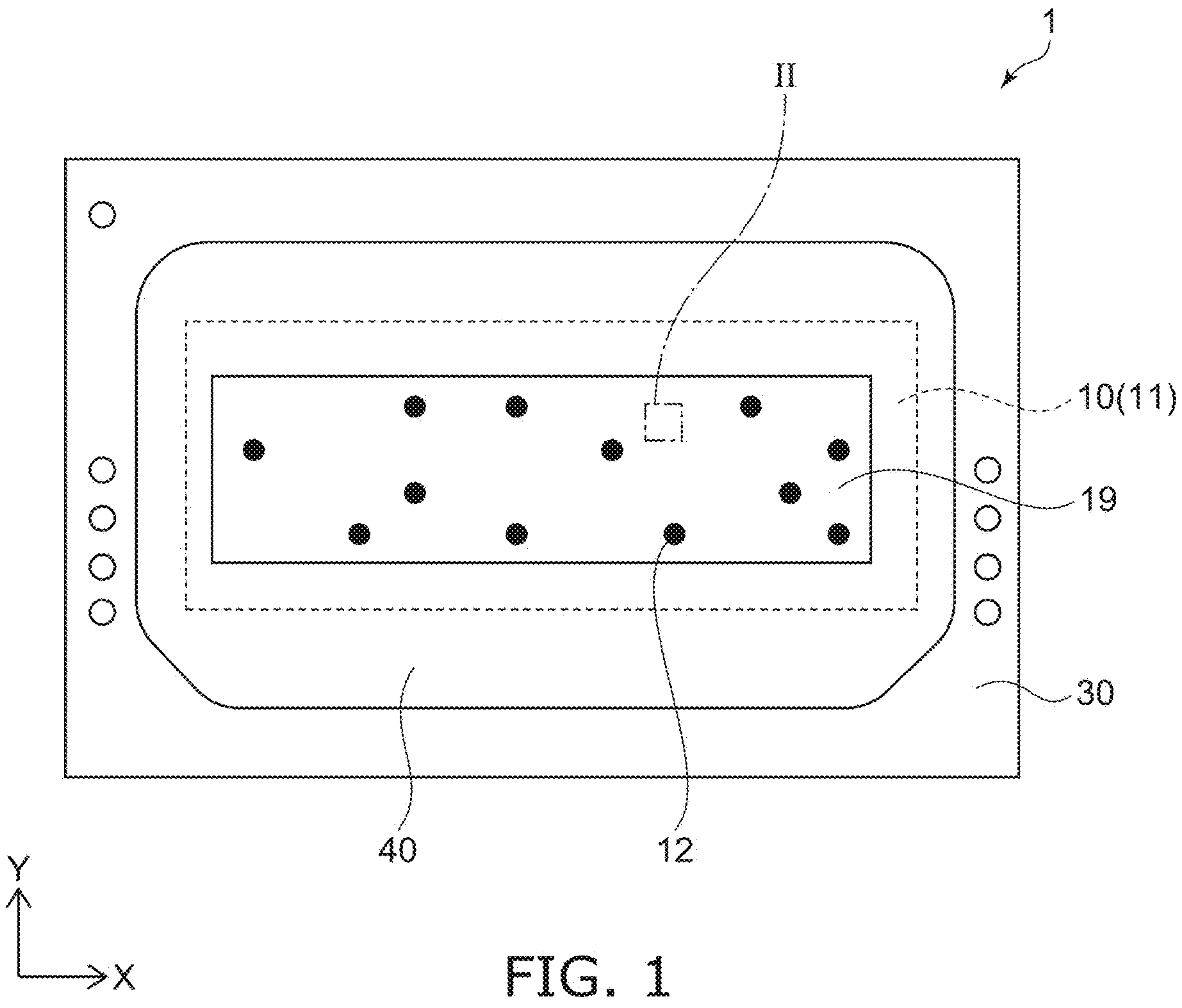
FIG. 1 illustrates a plan view of a light emitting module according to a first embodiment of the present disclosure.

FIG. 1 illustrates a plan view of a light emitting module according to the first embodiment.

Figure 2:
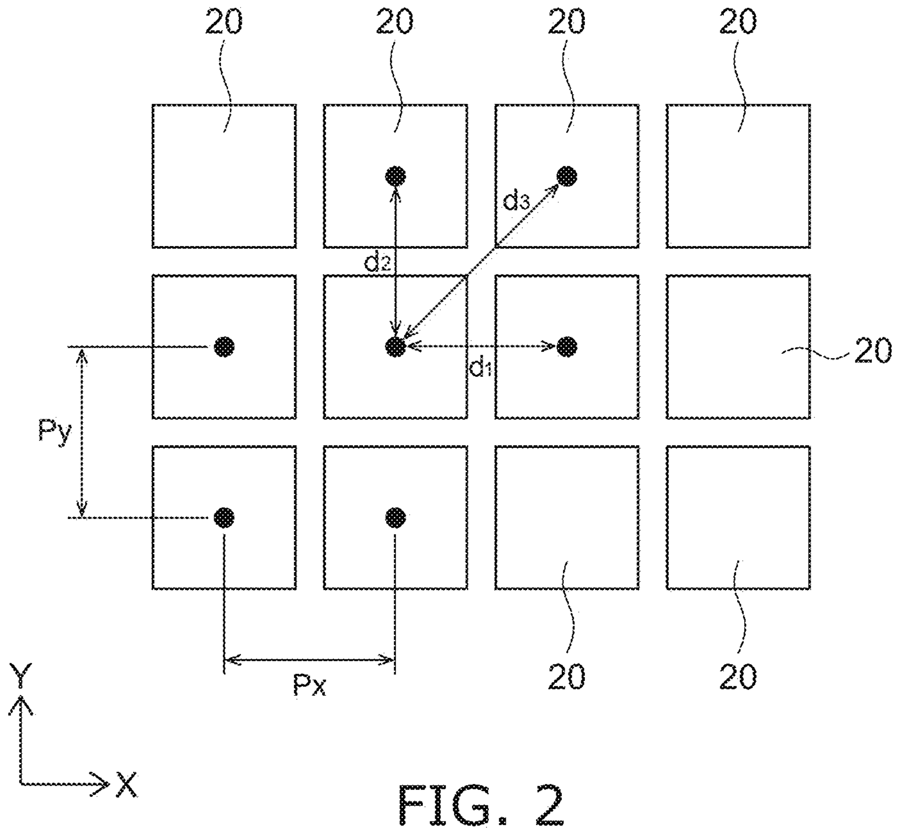
FIG. 2 illustrates an enlarged plan view of a region II in FIG. 1.

FIG. 2 illustrates an enlarged plan view of a region II in FIG. 1.

Figure 3:
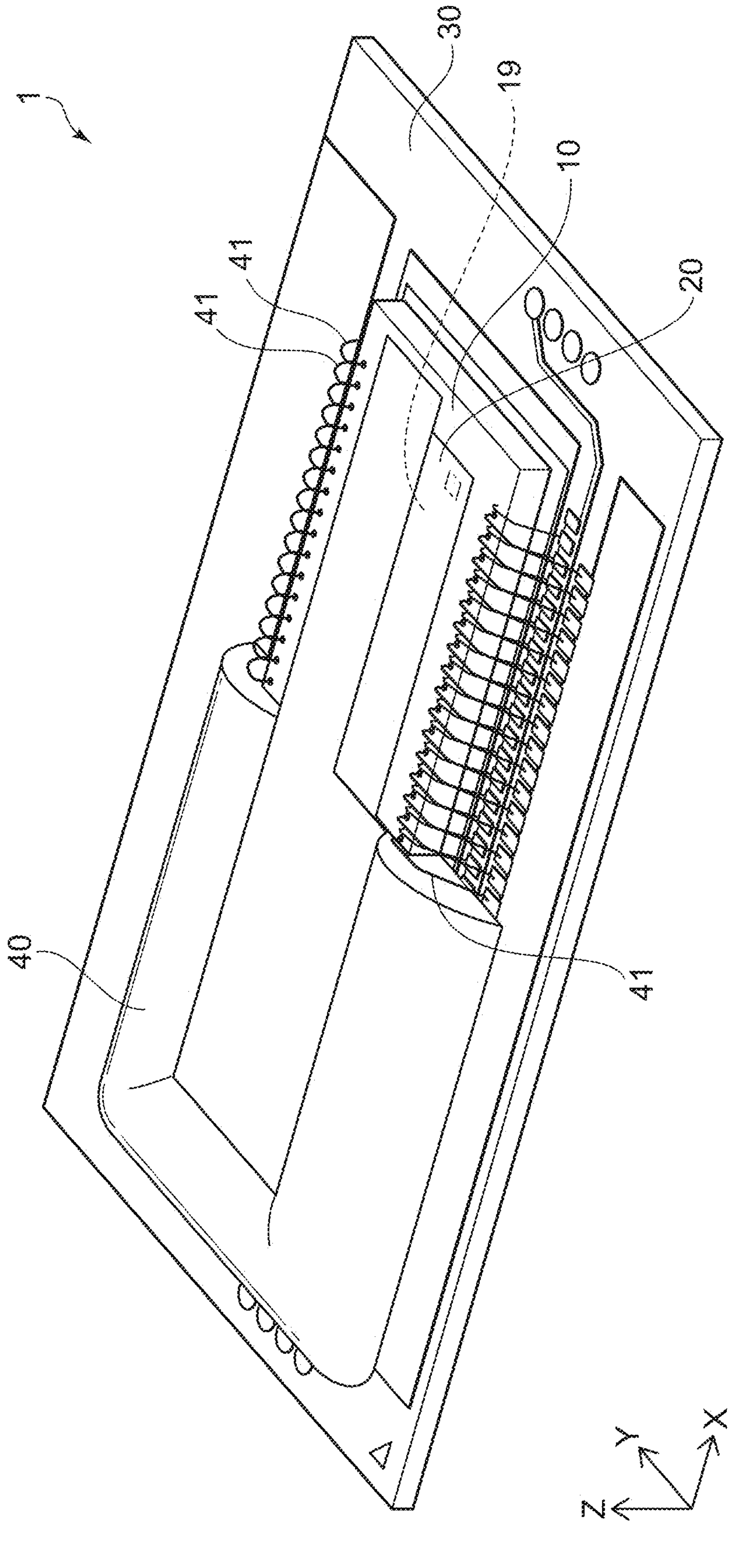
FIG. 3 illustrates a perspective view of the light emitting module according to the first embodiment.

FIG. 3 illustrates a perspective view of the light emitting module according to the first embodiment.

As shown in FIG. 1 to FIG. 3, a light emitting module 1 according to the first embodiment includes a wiring board 10 and a plurality of light emitting elements 20 arranged on the wiring board 10. The wiring board 10 has a controller 11 that estimates respective temperatures of the light emitting elements 20 based on a lighting pattern of the light emitting elements 20. The wiring board 10 may further have a fewer number of temperature sensors 12 than the light emitting elements 20.

The light emitting module 1 will be described in more detail below.

As shown in FIG. 1 and FIG. 3, the light emitting module 1 includes a module board 30. A wiring board 10 is disposed on an upper surface of the module board 30. For example, the wiring board 10 is a board having wires on the inside and on the surface of an insulating base material, e.g., an ASIC (application specific integrated circuit) board. The controller 11 is provided in the wiring board 10. Furthermore, a plurality of temperature sensors 12 are provided in the wiring board 10.

A portion of the upper surface of the wiring board 10 is defined as an emission region 19. In a plan view, the emission region 19 has, for example, a rectangular shape. The light emitting elements 20 are arranged in the emission region 19, for example, in a matrix. In one example, the light emitting elements 20 are arranged in a matrix of 256 pieces per row along the longer side and 64 pieces per column along the shorter side of the emission region 19. In this case, 16,384 pieces of light emitting elements 20 are arranged in the light emitting module 1. The number of temperature sensors 12 is fewer than that of the light emitting elements 20, for example, two or more, preferably 10 to about several tens. Each temperature sensor 12 is disposed at a position corresponding to one light emitting element 20.

On the module board 30 and on the wiring board 10, a frame shaped resin 40 is disposed to surround the emission region 19. Wires 41 for connecting terminals of the module substrate 30 to terminals of the wiring board 10 may be disposed in the resin 40. In the emission region 19, moreover, a wavelength conversion member may be disposed over the light emitting elements 20. The wavelength conversion member, for example, is plate or sheet shaped, and contains a phosphor, for example. In the case in which a wavelength conversion member or the like is disposed over the light emitting elements 20, FIG. 2 illustrates a view seen through the wavelength conversion member or the like.

As shown in FIG. 2, in the plan view, each light emitting element 20 has a quadrangular shape. The light emitting elements 20 are, for example, light emitting diodes (LEDs). In the plan view, it is assumed that an arrangement distance of two adjacent light emitting elements 20 in a direction along the longer side of the emission region 19 (hereinafter referred to as "X direction") is Px, and an arrangement distance of two adjacent light emitting elements 20 in a direction along the shorter side of the emission region 19 (hereinafter referred to as "Y direction") is Py. In this case, distance $d_1$ between centers of two adjacent light emitting elements 20 in the X direction is Px, distance $d_2$ between centers of two adjacent light emitting elements 20 in the Y direction is Py, and the distance $d_3$ between the centers of two adjacent light emitting elements in a diagonal direction is $d_3=\sqrt{(Px^2+Py^2)}$.

In more general terms, the distance $d_{ab}$ between the center of a light emitting element 20 and the center of the light emitting element 20 which is the $a^{th}$ in the X direction and the $b^{th}$ in the Y direction is $d_{ab}=\sqrt{\{(a\times Px)^2+(b\times Py)^2\}}$. In the case in which a light emitting element 20 has a quadrangular shape in a plan view, the center of the light emitting element 20 is an intersection of the two diagonal lines of the light emitting element 20. In one example, the arrangement distances Px and Py are 50 μm each.

In the light emitting module 1, the controller 11 controls the emission of the light emitting elements 20 based on external signals. For example, the controller 11 performs time division 256 gradation control on the light emitting elements 20. The controller 11 can individually control the light emitting elements 20. The controller 11 may control the emission of each light emitting element 20 by controlling a magnitude of an electric current supplied to each light emitting element 20. By allowing the controller 11 to individually control the gradation of the light emitted by each light emitting element 20 in this manner, various lighting patterns can be achieved by the light emitting elements 20 as a whole. In the first embodiment, furthermore, the controller 11 estimates respective temperature of the light emitting elements 20.

A temperature estimation method for a light emitting module according to the first embodiment will be explained next.

Figure 4:
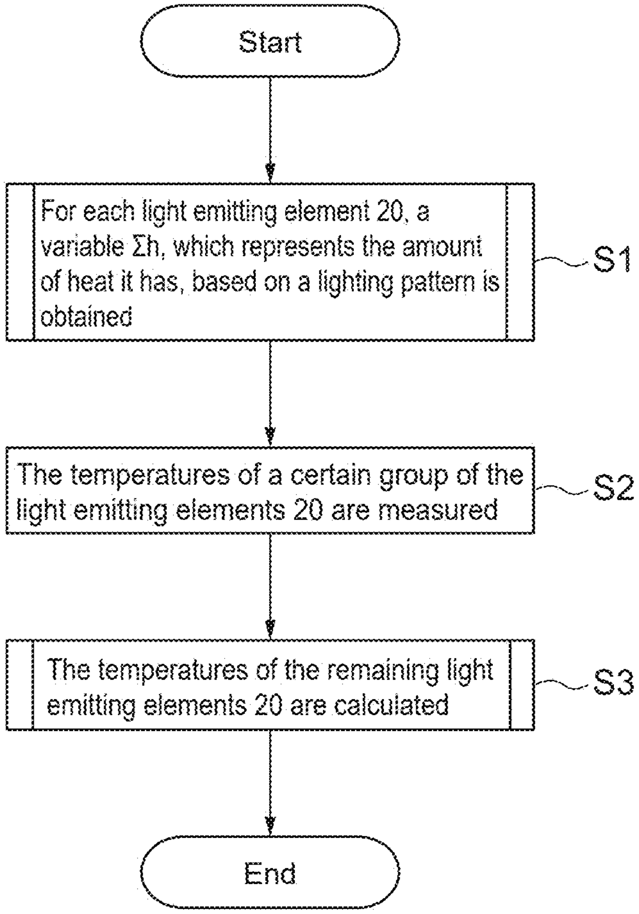
FIG. 4 is a flowchart of a temperature estimation method for a light emitting module according to the first embodiment.

FIG. 4 is a flowchart of a temperature estimation method for a light emitting module according to the first embodiment.

Figure 5:
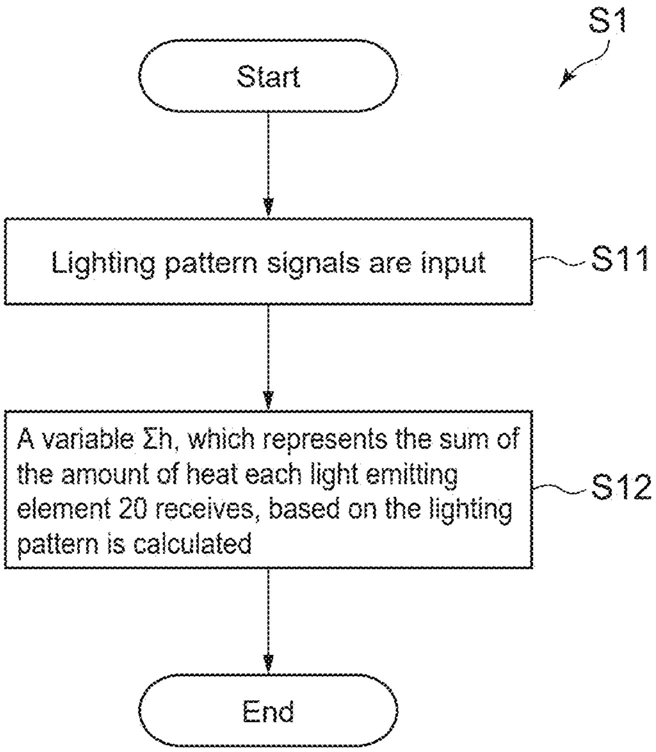
FIG. 5 is a flowchart of Step S1 in FIG. 4.

FIG. 5 is a flowchart of Step S1 in FIG. 4.

Figure 6:
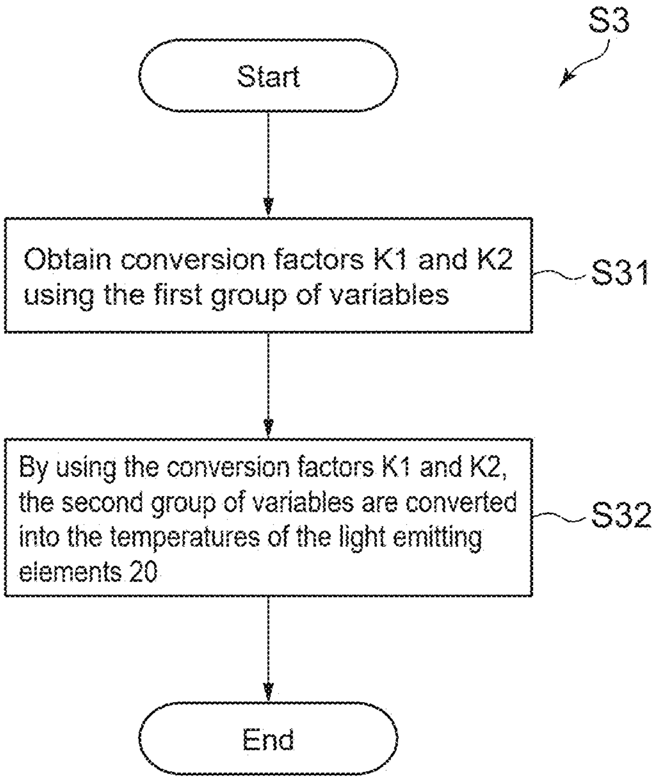
FIG. 6 is a flowchart of Step S3 in FIG. 4.

FIG. 6 is a flowchart of Step S3 in FIG. 4.

A temperature estimation method for a light emitting module according to the first embodiment is a method for estimating temperatures of the plurality of light emitting elements 20 included in the light emitting module 1. The temperature estimation method for a light emitting module according to the first embodiment includes a step of estimating the temperatures of the light emitting elements 20 based on a lighting pattern of the light emitting elements 20. This process is achieved by Step S1, Step S2, and Step S3 shown in FIG. 4. In the first embodiment, the controller 11 performs arithmetic processing for estimating the temperatures described below. The term "estimating" in the present disclosure may include an estimation of current or future conditions.

As shown in FIG. 4, the process of estimating the temperatures of the light emitting elements 20 includes a step of obtaining a plurality of variables Σh for the light emitting elements 20 by calculating a variable Σh for each of the light emitting elements 20 based on a lighting pattern of the light emitting elements 20 (Step S1). The variable Σh for one light emitting element 20 represents data that corresponds to an amount of heat the light emitting element 20 has. The process further includes a step of measuring temperatures of a certain group of the light emitting elements 20 (Step S2), and a step of obtaining temperatures of the remaining light emitting elements 20 by converting the variables Σh of the remaining light emitting elements 20 into their temperatures using the measured values obtained in the step of measuring the temperatures (Step S3).

The process will be explained in more detail below.

First, as shown in Step S1 in FIG. 4, a plurality of variables Σh are obtained by calculating for each of the light emitting elements 20 a variable Eh, which represents the data corresponding to the amount of heat the light emitting element 20 has, based on a lighting pattern of the light emitting elements 20.

Step S1 will be explained in detail below.

First, as shown in Step S11 in FIG. 5, signals representing a lighting pattern from the outside of the light emitting module 1 is input to the controller 11. In the present disclosure, a "lighting pattern" refers to a bright/dark pattern achieved by the light emitting elements 20 of the light emitting module 1 as a whole by individually controlling light emission gradations of the light emitting elements 20. Instead of inputting signals that represent a lighting pattern, the controller 11 may generate a lighting pattern.

Figures 7A, 7B, 8:
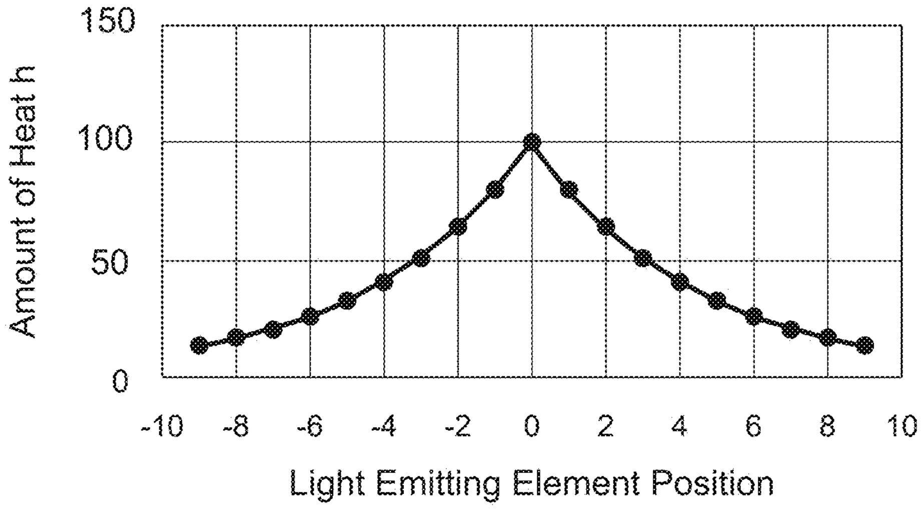
FIG. 7A is a chart showing examples of signals that represent a lighting pattern.
FIG. 7B is a chart showing examples of signals that represent another lighting pattern.
FIG. 8 is a graph showing an example of a function in which a horizontal axis represents a position of a light emitting element and a vertical axis represents an amount of heat.

FIG. 7A and FIG. 7B are charts showing examples of lighting pattern signals.

In each of FIG. 7A and FIG. 7B, the lighting pattern is shown using a 7×7 matrix for simplification purposes. In practice, however, a numerical value is preferably provided per light emitting element 20. Accordingly, for example, a lighting pattern is expressed by using a 64×256 matrix.

In each of the examples shown in FIG. 7A and FIG. 7B, the signals representing a lighting pattern is an arrangement of numerical values each representing a lighting percentage (%) of a light emitting element 20, which is an example of an intensity of light emitted by the light emitting element 20. In the case of performing time division control, the "lighting percentage" of a light emitting element 20 is, for example, the percentage of the time during which the light emitting element 20 is lit in one lighting period. In the case of performing current control, the "lighting percentage" for a light emitting element 20 is, for example, the percentage of a value of a current supplied to the light emitting element 20 relative to the maximum current value. In FIG. 7A and FIG. 7B, "100(%)" represents lighting at the brightest gradation, and "0(%)" represents not being lit. For example, in the case of performing time division 256 gradation (from 0 to 255) control on the light emitting elements 20, 255 is expressed as "100(%)" and 0 is expressed as "0(%)."

The lighting pattern shown in FIG. 7A is a pattern to cause the area near the center of the emission region 19 to produce high intensity light, and the lighting pattern in FIG. 7B is a pattern to cause the upper portion of the emission region 19 to produce high intensity light. However, lighting patterns are not limited to these examples.

Next, as shown in Step S12 in FIG. 5, for each light emitting element 20, a variable Eh corresponding to the sum of the amount of heat received by the light emitting element 20 is calculated based on the lighting pattern.

In the description below, a light emitting element which is the subject for variable computation will be referred to as a "light emitting element 20*a*" and another light emitting element that conducts heat to the light emitting element 20*a* will be referred to as a "light emitting element 20*b*." When a light emitting element 20*b* is lit, the light emitting element 20*b* generates heat. The light emitting element 20*b* heats up itself, and also the heat generated by the light emitting element 20*b* is conducted to its surroundings to thereby heat the light emitting elements 20 that surround it. Thus, the temperature of a light emitting element 20*a* is affected by not only its lighting condition, but also by the lighting conditions of light emitting elements 20*b* located around it. Accordingly, in estimating the temperature of a light emitting element 20*a*, it is preferable to obtain the sum of the amount of heat the light emitting element 20*a* receives from itself and light emitting elements 20*b* located around it. The lighting conditions of light emitting elements 20*b* located around the light emitting element 20*a* depend on the lighting pattern.

Specifically, a function f(d) representing the amount of heat a light emitting element 20*a* receives from the light emitting element 20*a* itself and a light emitting element 20*b* is established. In a general description, the function f(d) is a function of a distance from a heat source and the amount of heat received from the heat source. To describe in more detail, the function f(d) represents a relationship between the data representing the amount of heat a light emitting element 20*a* receives from the light emitting element 20*a* or a light emitting element 20*b* and the data representing the distance between the light emitting element 20*a* and the light emitting element 20*a* or the light emitting element 20*b*.

For example, assuming that the amount of heat a light emitting element 20*a* receives from the light emitting element 20*a* or another light emitting element 20*b* is h, the amount of heat the light emitting element 20*a* receives from the light emitting element 20*a* itself or the amount of heat the light emitting element 20*b* receives from the light emitting element 20*b* itself is $h_0$, the attenuation rate is r, and the distance between the center of the light emitting element 20*a* and the center of the light emitting element 20*a* or the light emitting element 20*b* is d, the function f(d) described above can be expressed by a formula (1) below, for example. The attenuation rate r is a value higher than 0, but lower than 1. The amount of heat described here means the data representing the amount of heat.

$$h=f(d)=h_0\times r^d \quad (1)$$

When a light emitting element 20*a* itself emits light, the amount of heat h the light emitting element 20*a* receives is $h=h_0\times r^0=h_0\times 1=h_0$ as the distance d is 0. In other words, the amount of heat the light emitting element 20*a* receives from itself is $h_0$.

FIG. 8 is a graph showing an example of the function f(d), where a horizontal axis represents a position of a light emitting element, and a vertical axis represents the amount of heat h.

The positions shown on the horizontal axis in FIG. 8 are the positions in the X or Y direction using the position of a light emitting element 20*b* that is lit as a reference. As for the plots shown in FIG. 8, the absolute value for each position along the horizontal axis in FIG. 8 corresponds to the distance d described above. In FIG. 8, the amount of heat $h_0$ is assumed to be 100, the attenuation rate is assumed to be 0.8, and each of the arrangement distances Px and Py is assumed to be 1. The attenuation rate r can be calculated based on the actual measurements of the temperatures of several light emitting elements 20 in the light emitting module 1. In this case, the distance between the centers of two adjacent light emitting elements 20 in the X or Y direction is 1. In this case, the formula (1) described above would be $h=100\times 0.8^d$. As shown in FIG. 8, the greater the distance d, the smaller the amount of heat h becomes.

Next, based on the lighting pattern, convolution integrals of the functions f(d) are obtained. In this manner, a variable Σh that is the sum of the amount of heat h received from the light emitting elements 20 is computed with respect to each light emitting element 20.

Convolution of the functions f(d) will be explained below. In the description below, for simplification purposes, a case will be explained in which only two light emitting elements 20*a* and 20*b* are lit, and the other light emitting elements 20 are not. The attenuation rate r used is 0.8, and each of the arrangement distances Px and Py is 1.

Figure 9A:
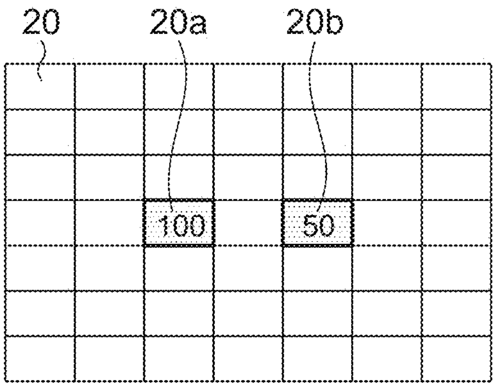
FIG. 9A is a chart showing an example of a lighting pattern.
Figure 9B:
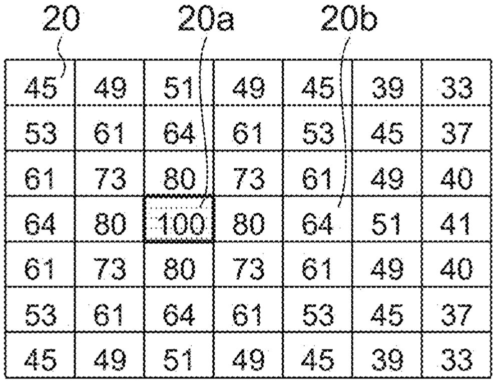
FIG. 9B is a chart showing an example of data representing an amount of heat a light emitting element 20*a* applies to itself and its surroundings.
Figure 9C:
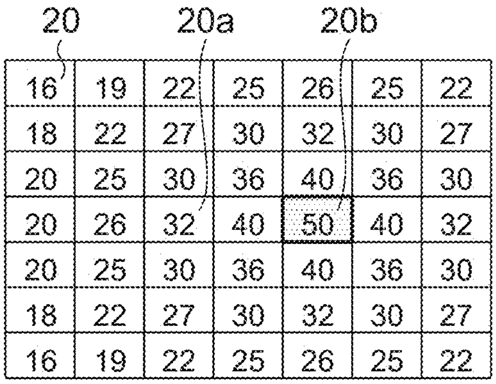
FIG. 9C is a chart showing an example of data representing an amount of heat a light emitting element 20*b* applies to itself and its surroundings.
Figure 9D:
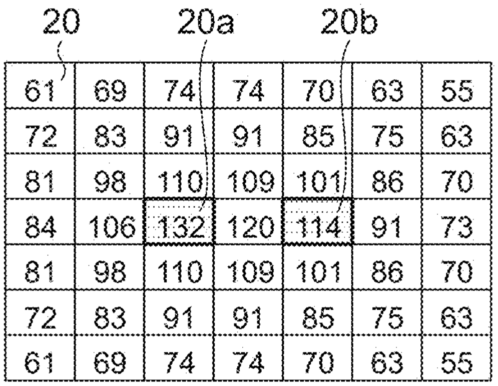
FIG. 9D is a chart showing a sum of the amount of heat applied by the light emitting element 20*a* and the light emitting element 20*b*.

FIG. 9A is a chart showing an example of a lighting pattern. FIG. 9B is a chart showing an example of data representing the amount of heat the light emitting element 20*a* applies to itself and its surroundings. FIG. 9C is a chart showing an example of data representing the amount of heat the light emitting element 20*b* applies to itself and its surroundings. FIG. 9D is a chart showing an example of data representing the sums of the amount of heat the light emitting elements 20*a* and 20*b* apply to themselves and their surroundings. For simplification purposes, the "data representing the amount of heat" may be simply referred to as "amount of heat" in the description below.

In this case, as shown in FIG. 9A, the lighting percentage of the light emitting element 20*a* is assumed to be 100%, the lighting percentage of the light emitting element 20*b* is assumed to be 50%, and the lighting percentage of any other light emitting elements 20 is assumed to be 0%. "0%" is not shown in the chart in FIG. 9A.

FIG. 9B shows only the amount of heat the light emitting element 20*a* applies to itself and its surroundings, i.e., the amount of heat applied by the light emitting element 20*b* are not reflected. In this case, based on the formula (1) described above, the amount of heat the light emitting element 20*a* has is 100, and the amount of heat the other light emitting elements 20 have become smaller as the distance from the light emitting element 20*a* increases. The amount of heat received by the light emitting element 20*b* based on the formula (1) is $100\times0.8^2=64$. As for any of the light emitting elements 20 adjacent to the light emitting element 20*a* in a diagonal direction, because the distance d from the light emitting element 20*a* is $d=\sqrt{(1^2+1^2)}=\sqrt{2}$, the amount of heat h received by such a light emitting element 20 would be $h=100\times0.8^{\sqrt{2}}\approx73$.

FIG. 9C shows only the amount of heat the light emitting element 20*b* applies to itself and its surroundings, i.e., the amount of heat applied by the light emitting element 20*a* are not reflected. In this case, based on the formula (1), the amount of heat the light emitting element 20*b* has is 50, and the amount of heat the other light emitting elements 20 have become smaller as the distance from the light emitting element 20*b* increases. The amount of heat received by the light emitting element 20*a* based on the formula (a) is $50\times0.8^2=32$.

The matrix shown in FIG. 9D is obtained by adding the numerical values in FIG. 9B and the numerical values in FIG. 9C, respectively. In the manner described above, a variable Eh that is equivalent to the sum of the amount of heat h received by each light emitting element 20 is calculated. For example, the variable Σh equivalent to the sum of the amount of heat received by the light emitting element 20*a* is 100+32=132, and the variable Σh equivalent to the sum of the amount of heat received by the light emitting element 20*b* is 50+64=114.

FIG. 10 is a chart showing the variables Σh corresponding to the light emitting elements.

As described above, the light emitting module 1 has a plurality of light emitting elements 20 and a plurality of temperature sensors 12, but the number of temperature sensors 12 is fewer than the number of light emitting elements 20. Thus, some of the light emitting elements 20 correspond to the positions of the temperature sensors 12, but the rest of the light emitting elements 20 do not correspond to the positions of the temperature sensors 12. The variables Σh for the light emitting elements 20 corresponding to the positions of the temperature sensors 12 will be referred to as "first group of variables," and the variables Σh for the remaining light emitting elements 20 as "second group of variables." In FIG. 10, the variables shown in the cells with hatching are the first group of variables, and the variables in the cells without hatching are the second group of variables.

The convolution of the functions f(d) may be performed with respect to all light emitting elements 20 in the light emitting module 1, or only those that surround a certain light emitting element 20 that is the subject for the variable Σh calculation. Performing convolution on only those light emitting elements 20 that surround a certain light emitting element can reduce the computational intensity. For example, computation can be performed only on the light emitting elements 20 up to the 10th from the subject light emitting element 20 in both the X and Y directions. In this case, convolution is performed for the 21×21 range around the subject light emitting element 20.

Convolution of the functions f(d) may be performed by running the formula (1) described above each time. Alternatively, the convolution may be performed through a filtering process using a kernel. In this case, a kernel is prepared beforehand by calculating kernel coefficients using the formula (1) described above. By aligning the central cell of the kernel with the cell in the matrix for a lighting pattern such as that shown in FIG. 7A that corresponds to the light emitting element 20 which is the subject for the variable Σh calculation, the product of the amount of heat and the kernel coefficient is obtained for each cell overlapping the kernel. The sum of all products is the variable Σh of the subject light emitting element 20. FIG. 11 is a diagram showing an example of a kernel used for convolution of the functions f(d).

The numerical value shown in each cell in FIG. 11 is a kernel coefficient. In the example shown in FIG. 11, the amount of heat $h_0$ is assumed to be 1, the attenuation rate ris assumed to be 0.8, and each of the arrangement distances Px and Py is assumed to be 1. Furthermore, the kernel size is a 5×5 matrix. The kernel size, as described above, may be a 21×21 matrix or otherwise. The larger the kernel size, the higher the accuracy becomes. However, the computational intensity also increases as the kernel size increases.

Step S1 in FIG. 4 completes when the variable 2 h is obtained for each of the light emitting elements 20 in the manner described above.

Next, as shown in Step S2 in FIG. 4, by using the temperature sensors 12, the temperatures of some of the light emitting elements 20 corresponding to the temperature sensors 12 are measured. The temperatures of a certain group of the light emitting elements 20 in the light emitting module 1 are thus measured. In this manner, a measured temperature value is obtained per temperature sensor 12.

FIG. 12 is a chart showing an example of measured temperature values of the certain group of the light emitting elements.

The matrix shown in FIG. 12 corresponds to the matrix shown in FIG. 10. In FIG. 12, the blank cells show the light emitting elements not corresponding to the temperature sensors 12 for which the temperatures are not measured. As shown in FIG. 10 and FIG. 12, the temperatures of the light emitting elements 20 corresponding to the first group of variables are measured, and the temperatures of the light emitting elements 20 corresponding to the second group of variables are not measured.

Next, as shown in Step S3 in FIG. 4, the temperatures of the remaining light emitting elements 20 in the light emitting module 1, i.e., the light emitting elements 20 corresponding to the second group of variables and not corresponding to the temperature sensors 12, are calculated (i.e., estimated).

Step S3 will be explained in detail below.

As shown in Step S31 in FIG. 6, conversion factors K1 and K2 that convert the first group of variables into the temperature values measured by the temperature sensors 12 are obtained. The conversion factors K1 and K2 are defined by the formulas (2) and (3) below, wherein Sen_a is an average value of the temperatures measured by the temperature sensors 12, Sen_r is a difference between the maximum and minimum measured values, Sim_a is an average value of the first group of variables, and Sim_r is a difference between the maximum and minimum values of the first group of variables.

$$K1=\text{Sen\_}r/\text{Sim\_}r \quad (2)$$

$$K2=\text{Sen\_}a-\text{Sim\_}a\times K1 \quad (3)$$

The conversion factor K1 is a ratio of the difference between the maximum and minimum measured values obtained by the temperature sensors 12 (Sen_r) to the difference between the maximum and minimum values of the first group of variables (Sim_r). The conversion factor K1 can match the difference between the maximum and minimum values of the first group of variables to the difference between the maximum and minimum values of the temperatures measured by the temperature sensors 12.

The conversion factor K2 is the difference between the average value of the temperatures measured by the temperature sensors 12 (Sen_a) and the average value of the first group of variables converted by the conversion factor K1 (Sim_a×K1). The conversion factor K2 can match the average value of the first group of variables converted by the conversion factor K1 to the average value of the temperatures measured by the temperature sensors 12.

The average value of the first group of variables Sim_a and the difference between the maximum and minimum values of the first group of variables Sim_r calculated by using the numerical values shown in FIG. 10 are as follows.

$$\text{Sim\_}a=83.1875$$

$$\text{Sim\_}r=114-61=53$$

The average value of the temperatures measured by the temperature sensors 12 Sen_a and the difference between the maximum and minimum measured values Sen_r calculated by using the numerical values shown in FIG. 12 are as follows.

$$\text{Sen\_}a=128.5625(^\circ\text{ C.})$$

$$\text{Sen\_}r=142-110=32(^\circ\text{ C.})$$

Thus, the conversion factors K1 and K2 calculated by using the numerical values shown in FIG. 10 and FIG. 12 are as follows.

$$K1=\text{Sen\_}r/\text{Sim\_}r=32/53=0.6038$$

$$K2=\text{Sen\_}a-\text{Sim\_}a\times K1=78.334$$

Next, as shown in Step S32 in FIG. 6, the conversion factors K1 and K2 are used in converting the second group of variables into the temperatures of the remaining light emitting elements 20. Specifically, when an estimated temperature value for a light emitting element 20 is T, the estimated temperature value T is calculated by the formula (4) below.

$$T=K1\times\Sigma h+K2 \quad (4)$$

By executing Step S3 in the manner described above, the temperatures of the remaining light emitting elements 20 are calculated.

Figures 13A, 13B, 14:
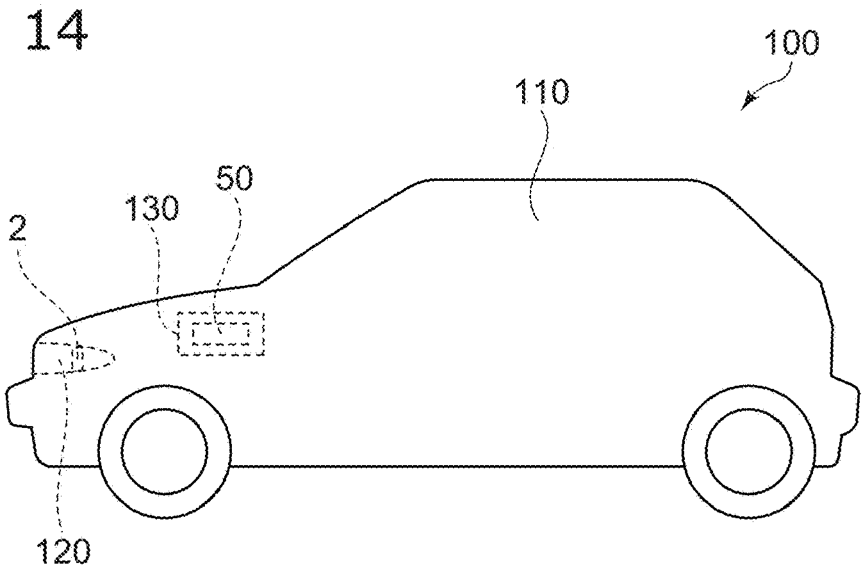
FIG. 13A is a chart showing an example of estimated temperature values of the light emitting elements.
FIG. 13B is a chart showing another example of estimated temperature values of the light emitting elements.
FIG. 14 is a diagram showing an automotive unit according to a second embodiment.

FIG. 13A and FIG. 13B are charts showing examples of the estimated temperature values of the light emitting elements 20.

In the examples shown in FIG. 13A and FIG. 13B, the estimated values T are calculated by using the numerical values shown in FIG. 10 and FIG. 12.

In the example shown in FIG. 13A, with respect to the estimated temperature values of the light emitting elements 20, the measured values obtained by the temperature sensors 12 are used for the light emitting elements 20 corresponding to the temperature sensors 12, and the estimated values T calculated by converting the second group of variables using the formula (4) described above are used for the light emitting elements 20 not corresponding to the temperature sensors 12. The cells using the values measured by the temperature sensors 12 are marked with hatching.

In the example shown in FIG. 13B, the estimated values T obtained by using the formula (4) are used for all light emitting elements 20. In other words, conversion based on the formula (4) is performed on the first group of variables in addition to the second group of variables. In this case, the measured values obtained by the temperature sensors 12 are only used as the data for calculating the conversion factors K1 and K2.

The controller 11 monitors the estimated temperature values of the light emitting elements 20. When the estimated temperature value of a light emitting element 20 exceeds a preset upper limit value, the controller 11 operates to reduce the emission intensity of or turns off the light emitting element 20. At this time, the controller 11 may also reduce the emission intensities of or turn off the light emitting elements 20 that surround the light emitting element 20 which exceeds the upper limit value.

The effect of the first embodiment will be explained next.

According to the first embodiment, the temperatures of all light emitting elements 20 can be estimated based on a lighting pattern of the light emitting elements 20 by using a fewer number of temperature sensors 12 than the light emitting elements 20. By controlling the temperatures of all light emitting elements 20 in this manner, overheat or damages on certain light emitting elements 20 can be avoided or reduced.

According to the first embodiment, moreover, the controller 11 estimates the temperatures of the light emitting elements 20 in the light emitting module 1. Thus, the temperatures of the light emitting elements 20 can be controlled independently, without requiring any auxiliary operation performed by an external arithmetic logic unit.

Second Embodiment

A second embodiment is an automotive unit equipped with a light emitting module.

In the second embodiment, a controller installed in a vehicle estimates the temperatures of the light emitting elements.

FIG. 14 is a diagram illustrating an automotive unit according to the second embodiment.

As shown in FIG. 14, the automotive unit 100 according to the second embodiment includes a light emitting module 2 and a controller 50 that controls the light emitting module 2. The light emitting module 2 has a wiring board 10 and a plurality of light emitting elements 20 arranged on the wiring board 10. The controller 50 estimates the temperatures of the light emitting elements 20 based on a lighting pattern of the light emitting elements 20.

The automotive unit 100 includes a vehicle 110 equipped with headlights 120, and an electronic control unit (ECU) 130 that controls the entire vehicle 110. The light emitting module 2 is a light source of each headlight 120. The headlight 120 is, for example, an adaptive driving beam (ADB) headlight. The controller 50 is included in the ECU 130. The controller 50 may be provided separately from the ECU 130.

The light emitting module 2 differs from the light emitting module 1 according to the first embodiment such that the controller 11, which is included in the light emitting module 2, does not estimate the temperatures of the light emitting elements 20. The other aspects of the light emitting module 2 are similar to those of the light emitting module 1 according to the first embodiment. The controller 11 may, however, have the capability of estimating the temperatures of the light emitting elements 20.

A temperature estimation method according to the second embodiment will be explained next.

Figure 15:
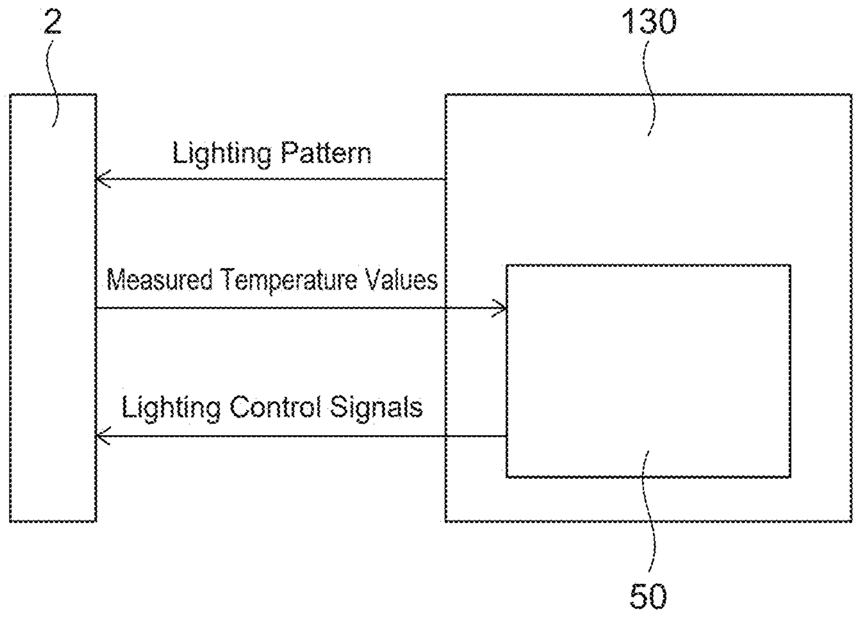
FIG. 15 is a block diagram showing a temperature estimation method according to the second embodiment.

FIG. 15 is a block diagram showing a temperature estimation method according to the second embodiment.

As shown in FIG. 15, in the second embodiment, the ECU 130 outputs signals (may be referred to as "lighting pattern signals") that represent a lighting pattern of the light emitting elements 20 to the light emitting module 2. The ECU 130 may have lighting patterns stored therein or generate a lighting pattern based on detection results of an external sensor.

Once the lighting pattern signals are input to the controller 11 of the light emitting module 2, the controller 11 controls the lighting of the light emitting elements 20. The temperature sensors 12 measure the temperatures of a certain group of the light emitting elements 20, and the controller outputs data representing the measured values to the controller 50 of the ECU 130. The controller 50 estimates the temperatures of all light emitting elements 20 based on the lighting pattern and the measured temperature values. The temperature estimation method is as described with reference to the first embodiment.

The controller 50 may generate and output the lighting control signals to the controller 11 of the light emitting module 2 to reduce the emission intensities of or turn off a light emitting element 20 whose estimated temperature value exceeded an upper limit value of a predetermined tolerable range and the surrounding light emitting elements 20 thereof.

According to the second embodiment, the temperatures of the light emitting elements 20 can be estimated by the controller 50 provided outside of the light emitting module 2. This configuration can simplify the configuration of the controller 11 of the light emitting module 2. Furthermore, the controller 50 can change the lighting pattern based on the estimated temperature values. The other constituents, the method, and the effect are similar to those in the first embodiment.

Third Embodiment

A temperature estimation method according to a third embodiment is a method of estimating the temperatures of the light emitting elements based on a lighting pattern and outputting the estimation results.

Figure 16:
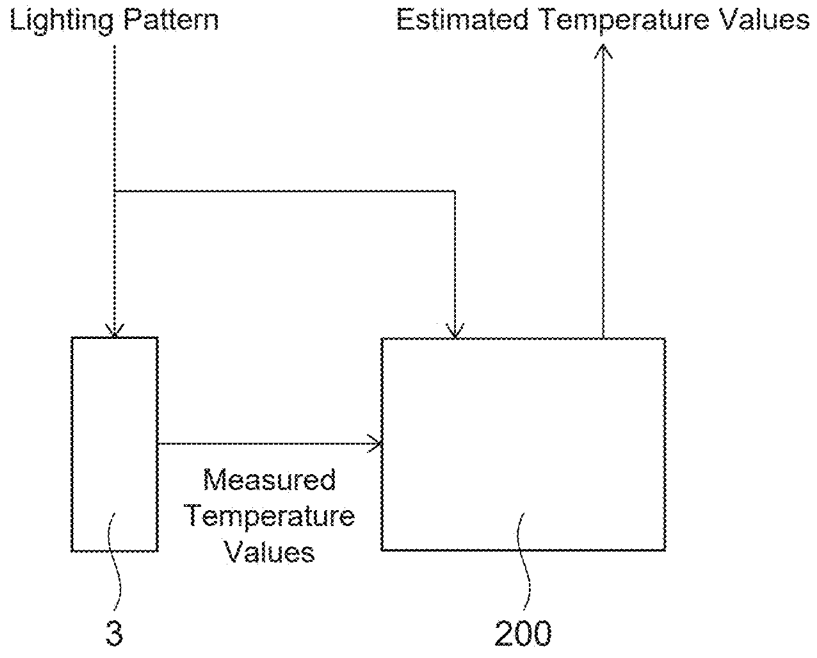
FIG. 16 is a block diagram showing a temperature estimation method according to a third embodiment.

FIG. 16 is a block diagram showing a temperature estimation method according to the third embodiment.

As shown in FIG. 16, in the third embodiment, lighting pattern signals for the light emitting elements 20 are input from the outside to the light emitting module 3 and a computer 200. The light emitting module 3 differs from the light emitting module 1 according to the first embodiment such that the controller 11, which is included in the light emitting module 3, does not estimate the temperatures of the light emitting elements 20. The controller 11 of the light emitting module 3 may, however, have the capability of estimating the temperatures of the light emitting elements 20. Furthermore, the computer 200 may be a general purpose computer or a dedicated computer.

Once lighting pattern signals are input to the controller 11 of the light emitting module 3, the controller 11 lights the light emitting elements 20 in accordance with a lighting pattern represented by the lighting pattern signals. The temperature sensors 12 measure the temperatures of a certain group of the light emitting elements 20, and data representing the measured values are output to the computer 200. The computer 200 estimates the temperatures of all light emitting elements 20 based on the lighting pattern input from the outside and the measured temperature values input from the light emitting module 3. The temperature estimation method is as described with reference to the first embodiment. The computer 200 then outputs the estimated temperature values of the light emitting elements 20 to an external element.

The computer 200 may perform the arithmetic processing described above by executing a program. This program is a temperature estimation program for the light emitting module 3 that includes a plurality of light emitting elements 20, and enables the computer 200 to execute the process of estimating the temperatures of the light emitting elements 20 based on a lighting pattern of the light emitting elements 20.

This program may be one that allows the computer 200 to execute predetermined processes. The predetermined processes include a process of obtaining a plurality of variables Eh by calculating for each of the light emitting elements 20 a variable Ch, which represents data corresponding to the amount of heat the light emitting element 20 has, based on a lighting pattern, and a process of obtaining temperature values of the remaining light emitting elements 20 by converting the variables Σh of the remaining light emitting elements 20 into their temperatures using the measured temperature values of the certain group of the light emitting elements 20.

According to the third embodiment, when a new lighting pattern is prepared, the lighting pattern can be evaluated from the standpoint of the temperatures of the light emitting elements prior to the lighting pattern being loaded. The other aspects, the method, and the effect of the third embodiment are similar to those in the first embodiment.

Fourth Embodiment

A temperature estimation method according to a fourth embodiment is a modified example of the temperature estimation method of the first embodiment, in which an error caused by a distance between the temperature sensor 12 and its corresponding light emitting element 20 in the height direction (Z direction) is corrected.

Figure 17:
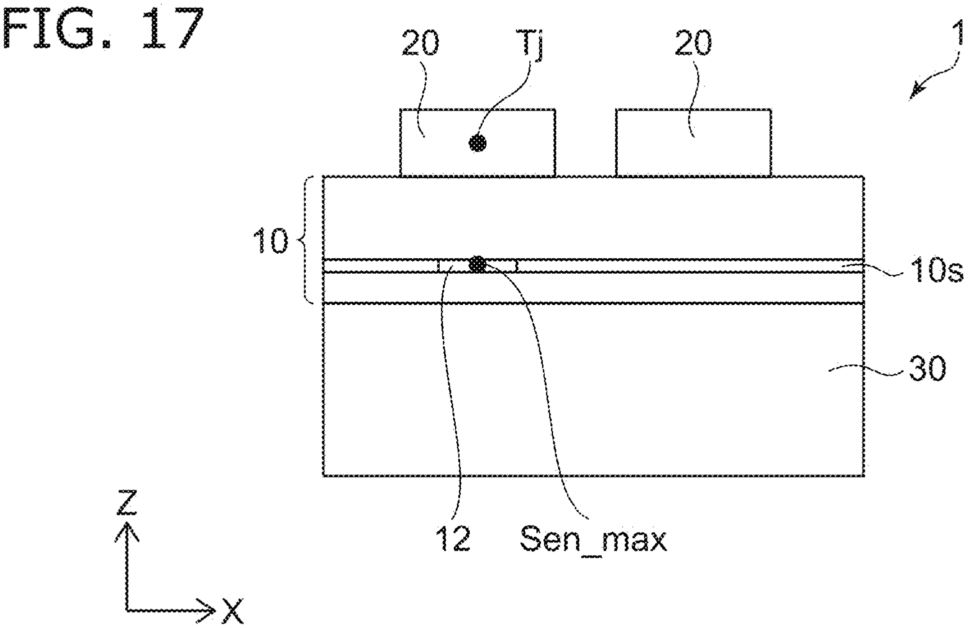
FIG. 17 illustrates a cross-sectional view of a light emitting module according to a fourth embodiment.

FIG. 17 illustrates a cross-sectional view of a light emitting module according to the fourth embodiment of the present disclosure.

As shown in FIG. 17, the configuration of a light emitting module 1 according to the fourth embodiment is the same as that of the light emitting module 1 according to the first embodiment. In the light emitting module 1 according to the fourth embodiment, the wiring substrate 10 is disposed on the module substrate 30, and the plurality of light emitting elements 20 are disposed on the wiring substrate 10.

Temperature sensors 12 of the light emitting module 1 are located in a sensor layer 10*s* in the wiring substrate 10, and the temperature sensors 12 are separated from the light emitting elements 20 in the height direction (Z direction). Therefore, especially when the distance between the sensor layer 10*s* and the light emitting element 20 is long, the measured value by the temperature sensor 12 may have a significant deviation from the actual temperature of the light emitting element 20. The actual temperature of the light emitting element 20 is, for example, the temperature of the light emitting layer in the light emitting element 20. In the fourth embodiment, a correction term ΔTjs is added to the formula (4) described in the first embodiment to correct the deviation. This allows for a more accurate estimation of the actual temperature of the light emitting elements 20.

In the fourth embodiment, an estimated temperature value of the light-emitting element 20 is Tj, a variable representing data corresponding to the amount of heat that the light emitting elements 20 have is Eh, conversion factors are K1 and K2, and the correction term is ΔTjs. The estimated temperature value Tj is calculated by the following formula (5). The variable Σh and the conversion factors K1 and K2 are the same as those in the first embodiment described above.

A maximum value among measured temperature values by a plurality of temperature sensors 12 is Sen_max, a minimum value among measured temperature values by a plurality of temperature sensors 12 is Sen_min, and the thermal diffusion coefficient is b. Then, the correction term ΔTjs is calculated by the following formula (6). When a distance from a certain light emitting element 20 to a certain temperature sensor 12 located directly below the light emitting element 20 is a unit distance, the thermal diffusion coefficient b is a rate at which heat is transferred over the unit distance. The unit distance is, for example, the shortest distance between a light emitting layer of the light emitting element 20 and the sensor layer 10*s*. The thermal diffusion coefficient b is a coefficient that depends on the configuration of the light emitting module 1 and takes a value greater than 0 and less than 1. In an example, the thermal diffusion coefficient b is 0.8.

$$Tj=K1\times\Sigma h+K2+\Delta Tjs \quad (5)$$

$$\Delta Tjs=\{\text{Sen\_max}-(1-b)\times\text{Sen\_min}\}/b-\text{Sen\_max} \quad (6)$$

The derivation process of the above equation (6) is explained below.

Figure 18:
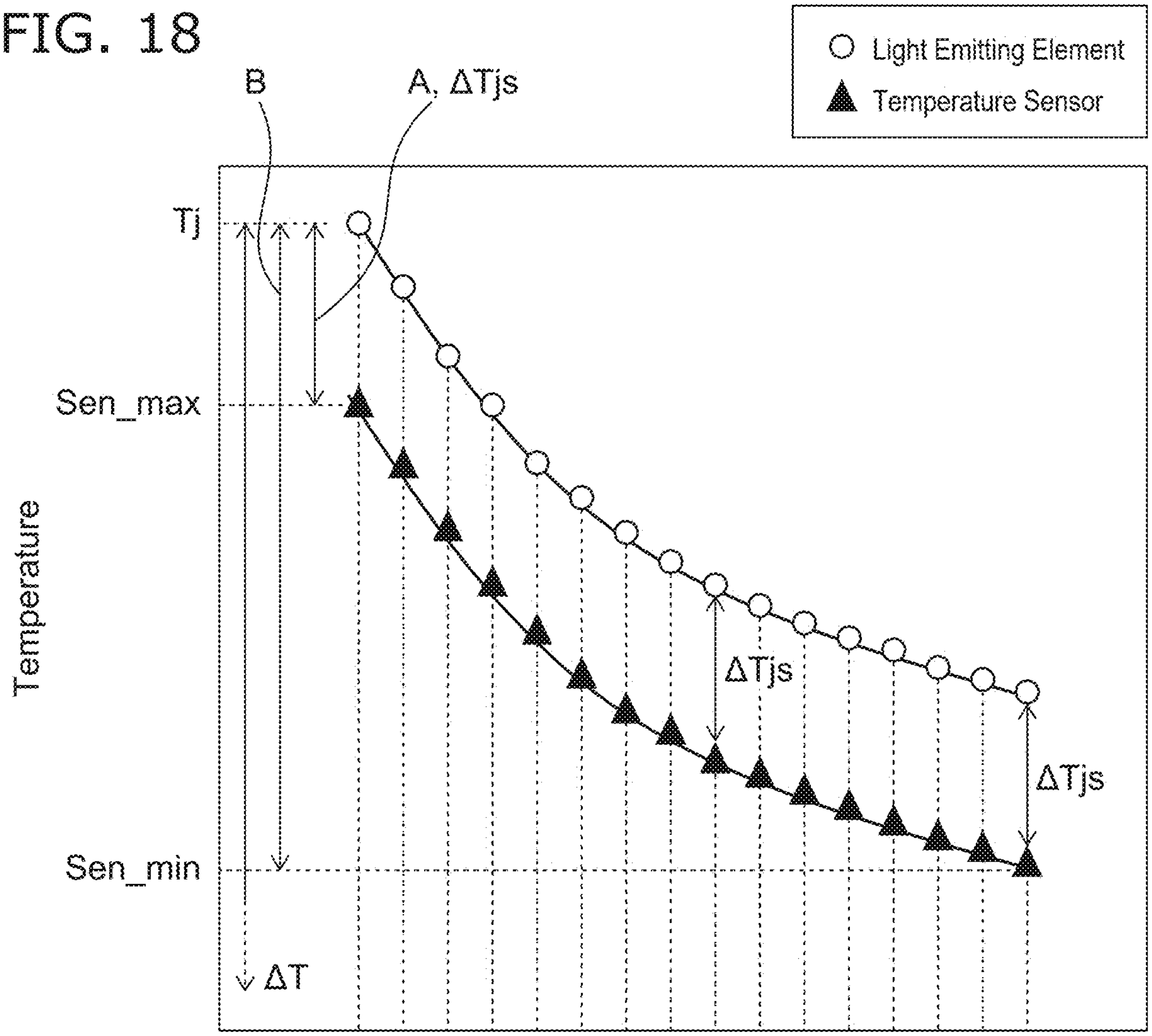
FIG. 18 is a graph showing an assumption in the fourth embodiment, in which a vertical axis represents temperature.

FIG. 18 is a graph showing an assumption in the fourth embodiment, in which a vertical axis represents temperature.

In FIG. 18, the measured temperature values of a plurality of temperature sensors 12 are arranged in descending order of temperature. Also, only the light emitting elements 20 located directly above the temperature sensors 12 are shown in FIG. 18. As shown in FIG. 18, the following two assumptions are made in the fourth embodiment.

(Assumption 1) A difference ΔTjs between a temperature of a certain light emitting element 20 and a measured temperature value of a temperature sensor 12 located directly below the light emitting element 20 is the same for all temperature sensors 12.

(Assumption 2) When a distance from a certain light emitting element 20 located directly above a certain temperature sensor 12 with the highest measured temperature value to the temperature sensor 12 with the lowest measured temperature value is the unit distance multiplied by n, a rate of heat transfer to the lowest temperature sensor 12 can be represented as $b^n$.

When an amount of heat generated from the light emitting element 20 is ΔT, a temperature difference A and a temperature difference B shown in FIG. 18 can be represented as in formulas (7) and (8) below. The temperature difference A refers to a difference between the temperature of a temperature sensor 12 with the highest measured temperature value and the temperature of a light emitting element 20 located directly above the temperature sensor 12. The temperature difference B refers to a difference between the temperature of a light emitting element 20 located directly above a temperature sensor 12 with the highest measured temperature value and the temperature of a temperature sensor 12 with the lowest measured temperature value.

$$A=\Delta Tjs=(1-b)\times\Delta T=Tj-\text{Sen\_max} \quad (7)$$

$$B=(1-b^n)\times\Delta T=Tj-\text{Sen\_min} \quad (8)$$

Based on the above formulas (7) and (8), the value of the ratio (A/B) can be calculated as follows.

$$A/B=\{(1-b)\times\Delta T\}/\{(1-b^n)\times\Delta T\}=(Tj-\text{Sen\_max})/(Tj-\text{Sen\_min})$$

Since b is greater than 0 and less than 1, if n is sufficiently large, the value of $(1-b^n)$ can be approximately 1. In this case, ΔT in the denominator and ΔT in the numerator cancel each other out in the above equation, and the above equation can be expressed as follows.

$$(1-b)=(Tj-\text{Sen\_max})/(Tj-\text{Sen\_min})$$

The above equation can be sequentially transformed as follows.

$$(1-b)\times(Tj-\text{Sen\_min})=(Tj-\text{Sen\_max})$$

$$(1-b)\times Tj-(1-b)\times\text{Sen\_min}=Tj-\text{Sen\_max}$$

$$Tj-b\times Tj-(1-b)\times\text{Sen\_min}=Tj-\text{Sen\_max}$$

$$Tj-b\times Tj-Tj=-\text{Sen\_max}+(1-b)\times\text{Sen\_min}$$

$$b\times Tj=Sen\text{\_max}-(1-b)\times\text{Sen\_min}$$

$$Tj=\{\text{Sen\_max}-(1-b)\times\text{Sen\_min}\}/b \quad (9)$$

In the above formula (7), ΔTjs=Tj−Sen_max. By substituting the above formula (9) into the above formula (7), the correction term ΔTjs is calculated as follows.

$$\Delta Tjs=\{\text{Sen\_max}-(1-b)\times\text{Sen\_min}\}/b-\text{Sen\_max}$$

Thus, the above formula (6) can be derived.

Next, the effects of the fourth embodiment will be explained.

According to the fourth embodiment, by adding the correction term ΔTjs shown in the above formula (6) to the above formula (5), the temperature difference caused by the distance between the light emitting element 20 and the temperature sensor 12 in the height direction (Z direction)

can be corrected. This enables more accurate estimate of the temperatures of the light emitting elements 20.

Test Example

A test example that demonstrates an effect of the fourth embodiment will be explained.

In the test example, a light emitting module 1 was prepared. Then, the temperature of each of the light emitting elements 20 in the light emitting module 1 was estimated by the temperature estimation method according to the first embodiment and the temperature estimation method according to the fourth embodiment. The temperature of each of the light emitting elements was actually measured from outside the light emitting module 1 using a VF (voltage/frequency) method with a thermal resistance measuring device. The VF method is a method of measuring the temperature of light emitting elements using, for example, VF fluctuations of the light emitting elements due to heat. The temperature of the light-emitting element may be also measured, for example, using a radiation thermometer. Such temperature estimate and actual measurement were performed for 16 different lighting patterns, and the difference between the estimated and measured temperature values was evaluated.

Figure 19:
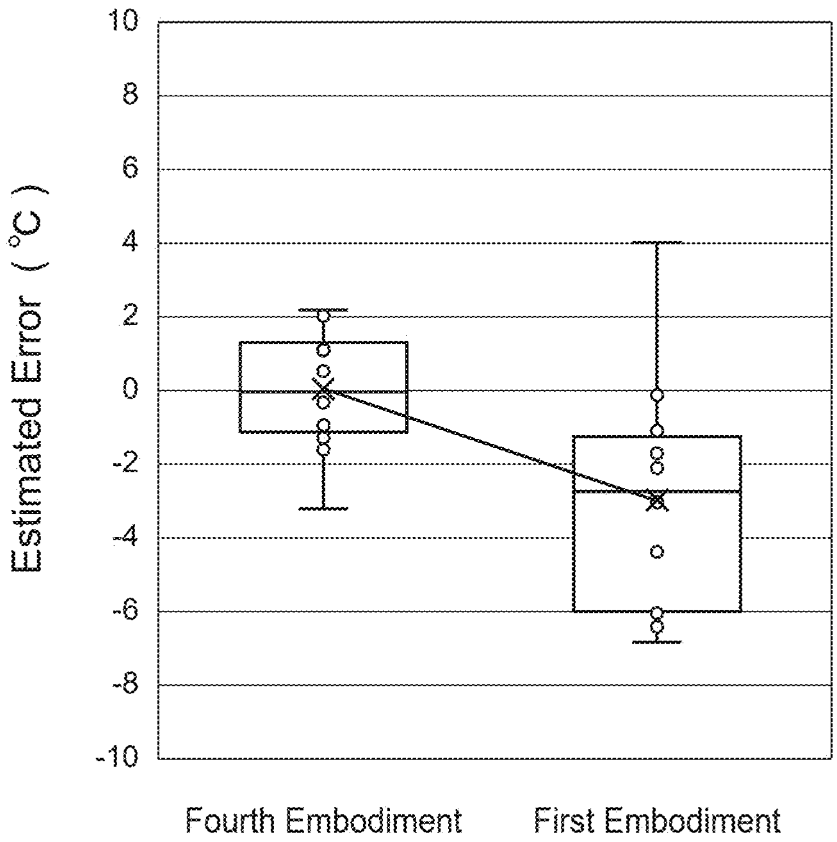
FIG. 19 is a graph showing a comparison of estimation accuracies of the first embodiment and the fourth embodiment, in which a horizontal axis represents the first and fourth embodiments, and a vertical axis represents estimate errors thereof, respectively.

FIG. 19 is a graph showing a comparison of the estimation accuracies of the first embodiment and the fourth embodiment, in which a horizontal axis represents the embodiments, and a vertical axis represents estimate errors.

Figure 20:
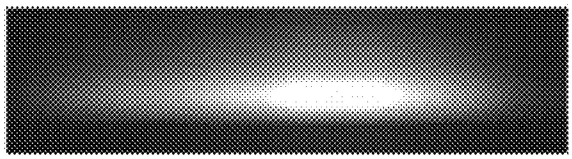
FIG. 20 is a chart showing a comparison of estimation accuracies of the first embodiment and the fourth embodiment relating to three representative lighting patterns.
Figure 20:
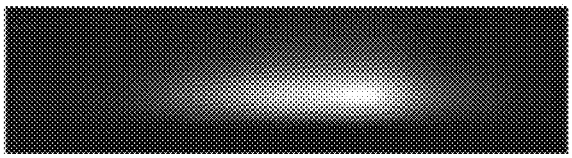
Figure 20:
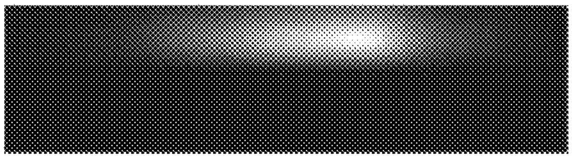

FIG. 20 is a chart showing a comparison of the estimation accuracies of the first embodiment and the fourth embodiment with respect to three representative lighting patterns.

The estimate error is a value obtained by subtracting an actual measured value from an estimated temperature value.

In other words, estimate error (Celsius)=estimated temperature value (Celsius)-actual measured value (Celsius).

The estimated temperature value is a value estimated by the temperature estimation method according to the first embodiment or the fourth embodiment, and the actual measured value is a value measured by the VF method using a thermal resistance measuring device.

As shown in FIG. 19, the results of the evaluation of 16 different lighting patterns indicate that, in the temperature estimation method according to the first embodiment, an average value of the estimation errors was −3° C., and the difference between the maximum temperature value and the minimum temperature value was 10.9° C. On the other hand, in the temperature estimation method according to the fourth embodiment, the average value of the estimation errors was approximately 0° C., and the difference between the maximum temperature value and the minimum temperature value was 4.5° C.

As shown in FIG. 20, in the three representative lighting patterns, that is, in a wide light distribution pattern, in a narrow light distribution pattern, and in an edge light distribution pattern, the temperature estimation method according to the fourth embodiment was able to estimate more accurately than the first embodiment. In particular, the estimate errors of the fourth embodiment were smaller in the narrow light distribution pattern and the edge light distribution pattern.

Thus, according to the fourth embodiment, the temperature of the light-emitting element could be estimated even more accurately than in the first embodiment.

The embodiments described above are provided to give shape to the present disclosure, and the present disclosure is not limited to these embodiments. For example, those resulting from adding to, removing from, or modifying certain constituent elements or processes in the embodiments described above are also encompassed by the present disclosure. The embodiments described above, moreover, can be implemented in combination with one another.

For example, the structure of the light emitting module is not limited to the examples described above as long as a plurality of light emitting elements are included. In each of the embodiments described above, an example in which the light emitting elements 20 are arranged in a matrix was shown without limiting the present disclosure thereto. The light emitting elements 20 may be arranged, for example, in a staggered pattern or a concentric circular pattern.

Furthermore, in each of the embodiments described above, an example in which the temperatures of the light emitting elements 20 are measured by the temperature sensors 12 disposed on the wiring board 10 was explained without limiting the temperature measuring method thereto. For example, the temperatures of the light emitting elements 20 may be measured by using another means disposed outside of the wiring substrate 10.

Furthermore, in each of the embodiments described above, an example which computes as conversion factors a conversion factor K1 for matching the difference between the maximum and minimum values of the first group of variables to the difference between the maximum and minimum measured values and a conversion factor K2 for matching the average value of the first group of variables to the average measured value was explained without limiting the present disclosure thereto. For example, standard deviations may be matched instead of the differences between the maximum and minimum values, and median values or most frequent values may be matched instead of average values.

Furthermore, in each of the embodiments described above, an example which employs an exponential function as the function f(d) for the amount of heat h was explained without limiting the present disclosure thereto. For example, a linear function may be used. In this case, for example, the function can be expressed as $h=h_0-r\times d$.

Embodiments include the following aspects.

Note 1

A temperature estimation method for a light emitting module which includes a plurality of light emitting elements, the temperature estimation method comprising a step of estimating the temperatures of the light emitting elements based on a lighting pattern of the light emitting elements.

Note 2

The temperature estimation method for a light emitting module according to note 1, wherein the step of estimating the temperatures of the light emitting elements comprises:

- a step of obtaining a plurality of variables by calculating the variable for each of the light emitting elements based on a lighting pattern of the light emitting elements, the variable representing the data that corresponds to an amount of heat which the light emitting element has;
- a step of measuring the temperatures of a certain group of the light emitting elements; and
- a step of obtaining the temperatures of the remaining light emitting elements by converting the variables using the measured temperature values obtained in the step of measuring the temperatures.

Note 3

The temperature estimation method for a light emitting module according to note 2, wherein

- the light emitting module comprises a wiring board on which the light emitting elements are disposed, the wiring board including a fewer number of temperature sensors than the light emitting elements, and in the step of measuring the temperatures, the certain group of the light emitting elements are measured by the temperature sensors.

Note 4

The temperature estimation method for a light emitting module according to note 3, wherein the step of obtaining the plurality of variables is a step of obtaining the variables consisting of a first group of the variables corresponding to positions of the temperature sensors and a second group of the variables corresponding to remaining positions, by calculating for each of the light emitting elements the variables, each of which represents a sum of the amount of heat received by the light emitting element by obtaining a convolution integral of functions, the function representing relationship between data corresponding to the amount of heat which the light emitting element receives from the light emitting element itself or other light emitting elements based on a lighting pattern of the light emitting elements and data corresponding to a distance between the light emitting element and the light emitting element itself or the other light emitting elements, and the step of calculating the temperatures comprises:

a step of obtaining conversion factors that convert the first group of variables into measured temperature values obtained by the temperature sensors, and a step of using the conversion factors in converting the second group of variables into the temperatures of the light emitting elements.

Note 5

The temperature estimation method for a light emitting module according to note 4, wherein the function is expressed as $h=h_0 \times r^d$, where h is the amount of heat which a light emitting element receives from the light emitting element itself or other light emitting elements, $h_0$ is (i) the amount of heat which the light emitting element receives from the light emitting element itself or (ii) the amount of heat which the other light emitting elements receive from the other light emitting element themselves, r is an attenuation rate, and d is the distance between a center of the light emitting element and the center of the light emitting element itself or the distance between the center of the light emitting element and a center of the other light emitting element.

Note 6

The temperature estimation method for a light emitting module according to note 4 or 5, wherein the conversion factors are K1 and K2 defined below:

$$K1=\text{Sen\_}r/\text{Sim\_}r \text{ and}$$

$$K2=\text{Sen\_}a\text{-Sim\_}a \times K1,$$

where Sen_a is an average value of those measured by the temperature sensors, Sen_r is the difference between maximum and minimum measured values, Sim_a is an average value of the first group of variables, and Sim_r is the difference between maximum and minimum values of the first group of variables.

Note 7

The temperature estimation method for a light emitting module according to note 6, wherein the estimated temperature value of a light emitting element is obtained by a formula, T=K1×Σh+K2, where Tis estimated temperature value of the light emitting element and Σh is the variable representing the sum of the amount of heat which the light emitting element receives.

Note 8

The temperature estimation method for a light emitting module according to note 6, wherein the estimated temperature value Tj of a light emitting element is obtained by formula represented below:

$$Tj=K1\times 2h+K2+\Delta Tjs, \text{ and}$$

$$\Delta Tjs=\{\text{Sen\_max}-(1-b)\times\text{Sen\_min}\}/b-\text{Sen\_max},$$

Where Σh is the variable representing the sum of the amount of heat which the light emitting element receives, ΔTjs is a correction term, Sen_max is a maximum temperature value among the measured values by the plurality of the temperature sensors, Sen_min is a minimum temperature value among the measured values by the plurality of the temperature sensors, a distance between the light emitting element and the temperature sensor located directly below the light emitting element is a unit distance, b is a thermal diffusion coefficient representing a rate at which heat is transferred over the unit distance, and Tj is the estimated temperature value of the light emitting element.

Note 9

The temperature estimation method for a light emitting module according to any one of notes 1-8, wherein the light emitting elements are disposed in a matrix arrangement.

Note 10

A light emitting module comprising:

a wiring board, and a plurality of light emitting elements disposed on the wiring board, wherein the wiring board has a controller that estimates temperatures of the light emitting elements based on a lighting pattern of the light emitting elements.

Note 11

The light emitting module according to note 10, wherein the controller obtains variables by calculating the variable for each of the light emitting elements based on a lighting pattern of the light emitting elements, the variable representing data corresponding to an amount of heat which the light emitting element has, and the controller obtains temperatures of remaining light emitting elements by converting the variables using the measured temperature values of a certain group of the light emitting elements.

Note 12

The light emitting module according to note 11, wherein the wiring board further includes a fewer temperature sensors than the light emitting elements, and the measured temperature values are measured by the temperature sensors.

Note 13

The light emitting module according to note 12, wherein the controller obtains variables, which consist of a first group of variables corresponding to positions of the temperature sensors and a second group of variables corresponding to remaining positions, by calculating for each of the light emitting elements a variable, which represents sum of the amount of heat which is received by the light emitting element, by obtaining a convolution integral of functions, the function representing relationship between data corresponding to the amount of heat the light emitting element receives from the light emitting element itself or other light emitting elements based on the lighting pattern of the light emitting elements and data corresponding to distance between the light emitting element and light emitting element itself or the other light emitting element, the controller obtains conversion factors that convert the first group of variables into the measured values obtained by the temperature sensors, and the controller uses the conversion factors in converting the second group of variables into the temperatures of the light emitting elements.

Note 14

The light emitting module according to any one of notes 10-13, wherein the light emitting elements are disposed in a matrix arrangement.

Note 15

An automotive unit comprising:

a light emitting module having a wiring board and a plurality of light emitting elements disposed on the wiring board, and a controller that controls the light emitting module, wherein the controller estimates temperatures of the light emitting elements based on a lighting pattern of the light emitting elements.

Note 16

The automotive unit according to note 15, wherein the controller obtains variables by calculating a variable for each of the light emitting elements based on a lighting pattern of the light emitting elements, the variable representing the data corresponding to the amount of heat which the light emitting element has, and the controller obtains the temperatures of remaining light emitting elements by converting the variables using the measured temperature values of a certain group of the light emitting elements.

Note 17

The automotive unit according to note 16, wherein the wiring board further includes a fewer temperature sensors than the light emitting elements, and the measured temperature values are measured by the temperature sensors.

Note 18

The automotive unit according to note 17, wherein the controller obtains variables, which consist of a first group of variables corresponding to positions of the temperature sensors and a second group of variables corresponding to remaining positions, by calculating for each of the light emitting elements a variable, which represents sum of the amount of heat which is received by the light emitting element, by obtaining a convolution integral of functions, the function representing relationship between data corresponding to the amount of heat the light emitting element receives from the light emitting element itself or other light emitting elements based on the lighting pattern of the light emitting elements and data corresponding to the distance between the light emitting element and the light emitting element itself or the other light emitting element, the controller obtains conversion factors that convert the first group of variables into the values measured by the temperature sensors; and the controller uses the conversion factors in converting the second group of variables into the temperatures of the light emitting elements.

Note 19

The automotive unit according to any one of notes 15-18, wherein the light emitting module is a light source of a headlight of a vehicle, and the controller is included in an ECU of the vehicle.

What is claimed is:

1. A light emitting module comprising:

a wiring board;

a plurality of light emitting elements on the wiring board;

a plurality of temperature sensors provided in correspondence with a first part, and not all, of the light emitting elements, respectively; and a controller provided in the wiring board, the controller being configured to:

control the plurality of light emitting elements to operate in accordance with a lighting pattern, which represents an intensity of light emitted from each of the light emitting elements;

based on the lighting pattern of the light emitting module and respective temperatures of the first part of the light emitting elements measured by the plurality of temperature sensors, respectively, estimate respective temperatures of at least a second part of the light emitting elements that are different from the first part of the light emitting elements; and control at least one of the second part of the light emitting elements based on the estimated temperature of the at least one of the second part of the light emitting elements, in estimating the respective temperatures of at least the second part of the light emitting elements, the controller being configured to calculate, with respect to each of the light emitting elements that are operated in accordance with the lighting pattern, a variable corresponding to an amount of heat received by the light emitting element, based on the lighting pattern; and calculate the respective temperatures of the second part of the light emitting elements, based on a relationship among the measured respective temperatures of the first part of the light emitting elements and the calculated respective variables of the light emitting elements, in calculating the respective temperatures of the second part of the light emitting elements, the controller being configured to determine a value of one or more conversion factors using a relationship among an average value of the measured respective temperatures of the first part of the light emitting elements, a difference between a maximum value and a minimum value of the measured respective temperatures of the first part of the light emitting elements, an average value of the respective variables of the light emitting elements, and a difference between a maximum value and a minimum value of the respective variables of the light emitting elements; and convert respective variables of said at least a part of the light emitting elements to the respective temperatures of said at least a part of the light emitting elements using the determined value of one or more conversion factors, the one or more conversion factors including a first conversion factor K1 and a second conversion factor K2, $K1=Sen\_r/Sim\_r$, and $K2=Sen\_a-Sim\_a \times K1$, wherein Sen_a is the average value of the measured respective temperatures of the first part of the light emitting elements, Sen_r is the difference between the maximum value and the minimum value of the measured respective temperature of the first part of the light emitting elements, Sim_a is the average value of the respective variables of the light emitting elements, and Sim_r is the difference between the maximum value and the minimum value of the respective variables of the light emitting elements, in converting the respective variables, the controller being configured to use a following formula:

$T=K1 \times \Sigma h+K2$, wherein T is a temperature and Σh is the variable of a light emitting element.

2. The light emitting module according to claim 1, wherein the plurality of light emitting elements is arranged in a matrix form.

3. An automotive unit comprising:

a light emitting module mountable on a vehicle, the light emitting module including a wiring board, a plurality of light emitting elements on the wiring board, and a plurality of temperature sensors provided in correspondence with a first part, and not all, of the light emitting elements, respectively; and a controller mountable on the vehicle, the controller being configured to:

control the plurality of light emitting elements to operate in accordance with a lighting pattern, which represents an intensity of light emitted from each of the light emitting elements;

based on the lighting pattern of the light emitting module and respective temperatures of the first part of the light emitting elements measured by the plurality of temperature sensors, respectively, estimate respective temperatures of at least a second part of the light emitting elements that are different from the first part of the light emitting elements; and control at least one of the second part of the light emitting elements based on the estimated temperature of the at least one of the second part of the light emitting elements, in estimating the respective temperatures of at least the second part of the light emitting elements, the controller being configured to calculate, with respect to each of the light emitting elements that are operated in accordance with the lighting pattern, a variable corresponding to an amount of heat received by the light emitting element, based on the lighting pattern; and calculate the respective temperatures of the second part of the light emitting elements, based on a relationship among the measured respective temperatures of the first part of the light emitting elements and the calculated respective variables of the light emitting elements, in calculating the respective temperatures of the second part of the light emitting elements, the controller being configured to determine a value of one or more conversion factors using a relationship among an average value of the measured respective temperatures of the first part of the light emitting elements, a difference between a maximum value and a minimum value of the measured respective temperatures of the first part of the light emitting elements, an average value of the respective variables of the light emitting elements, and a difference between a maximum value and a minimum value of the respective variables of the light emitting elements; and convert respective variables of said at least a part of the light emitting elements to the respective temperatures of said at least a part of the light emitting elements using the determined value of one or more conversion factors, the one or more conversion factors including a first conversion factor K1 and a second conversion factor K2, $K1=Sen\_r/Sim\_r$, and $K2=Sen\_a-Sim\_a \times K1$, wherein Sen_a is the average value of the measured respective temperatures of the first part of the light emitting elements, Sen_r is the difference between the maximum value and the minimum value of the measured respective temperature of the first part of the light emitting elements, Sim_a is the average value of the respective variables of the light emitting elements, and Sim_r is the difference between the maximum value and the minimum value of the respective variables of the light emitting elements, in converting the respective variables, the controller being configured to use a following formula:

$T=K1 \times \Sigma h+K2$, wherein T is a temperature and Σh is the variable of a light emitting element.

4. The automotive unit according to claim 3, wherein the light emitting module is a light source of a headlight, and the controller is included in an electronic control unit (ECU) of the vehicle.

* * * * *